US008249829B2

(12) United States Patent
Vass et al.

(10) Patent No.: US 8,249,829 B2
(45) Date of Patent: Aug. 21, 2012

(54) ONLINE CONDITION-BASED MONITORING FOR TANK FARMS

(75) Inventors: Jiri Vass, Prague (CZ); Petr Stluka, Prague (CZ); Bin Sai, Zuid Holland (NL)

(73) Assignee: Honeywell International Inc., Morristown, NJ (US)

( * ) Notice: Subject to any disclaimer, the term of this patent is extended or adjusted under 35 U.S.C. 154(b) by 360 days.

(21) Appl. No.: 12/777,826

(22) Filed: May 11, 2010

(65) Prior Publication Data

US 2010/0299105 A1 Nov. 25, 2010

Related U.S. Application Data

(60) Provisional application No. 61/179,976, filed on May 20, 2009.

(51) Int. Cl.
*G06F 19/00* (2011.01)

(52) U.S. Cl. ......... 702/184; 702/45.7; 702/185; 702/55; 702/127; 702/179; 73/53.01; 73/313; 73/49.2; 340/635

(58) Field of Classification Search ............... 702/45, 702/184, 185, 55, 50, 127, 100, 179, 180, 702/181; 714/E11.207; 701/202, 220, 300, 701/123, 104, 519; 73/53.01, 313, 61.59, 73/49.2, 302; 705/7, 26; 340/635, 870.16, 340/870.07, 870.11, 618; 700/104
See application file for complete search history.

(56) References Cited

U.S. PATENT DOCUMENTS

| | | | |
|---|---|---|---|
| 6,321,602 B1 | 11/2001 | Ben-Romdhane | |
| 6,700,503 B2* | 3/2004 | Masar et al. | 340/870.01 |
| 7,254,521 B2 | 8/2007 | Dauss et al. | |
| 7,295,919 B2* | 11/2007 | Humphrey | 702/55 |
| 7,512,488 B2* | 3/2009 | Humphrey | 701/519 |
| 7,937,215 B2* | 5/2011 | Humphrey | 702/55 |
| 7,937,216 B2* | 5/2011 | Humphrey | 702/55 |
| 8,068,727 B2* | 11/2011 | Phillips et al. | 392/441 |
| 8,150,615 B2* | 4/2012 | Humphrey | 701/104 |
| 2004/0204870 A1* | 10/2004 | Schimnowski et al. | 702/45 |
| 2005/0038667 A1* | 2/2005 | Hileman et al. | 705/1 |
| 2006/0111040 A1* | 5/2006 | Jenkins et al. | 455/12.1 |
| 2006/0167660 A1* | 7/2006 | Hatch | 702/185 |
| 2009/0056644 A1* | 3/2009 | Phillips et al. | 122/15.1 |

FOREIGN PATENT DOCUMENTS

JP 2005116599 10/2006
* cited by examiner

*Primary Examiner* — Carol Tsai
(74) *Attorney, Agent, or Firm* — Jetter & Associates, P.A.

(57) ABSTRACT

A method for online condition-based monitoring (CBM) of a tank farm including a plurality of storage tanks includes providing a tank model including a diagnostic and/or predictive tank model based on calculated tank metrics that is derived from historical data including tank operation data. The calculated tank metrics include tank operational metrics based on the tank operational data for the storage tanks and tank condition metrics based on tank inspection or maintenance data for the storage tanks. The tank model provides relationships between the tank condition metrics and the tank operational metrics. Results are generated using the tank model including at least one failure indicia for at least a first of the storage tanks using the calculated tank metrics and current measured data for the first tank as inputs to the tank model. The failure indicia is processed for scheduling at least one maintenance task for the first tank.

20 Claims, 3 Drawing Sheets

ONLINE CONDITION-BASED MONITORING FOR TANK FARMS

CROSS REFERENCE TO RELATED APPLICATIONS

This application and the subject matter disclosed herein claims the benefit of Provisional Application Ser. No. 61/179,976 entitled "An Online Condition-Based Maintenance System for Tank Farms", filed May 20, 2009, which is herein incorporated by reference in its entirety.

FIELD

Disclosed embodiments relate to condition-based monitoring (CBM) for tank maintenance scheduling of tank farms.

BACKGROUND

Tank farms include a plurality of storage containers or tanks, referred to herein as storage tanks. Storage tanks can be above the ground storage tanks (ASTs) or underground storage tanks (USTs). The tanks can be on land, ships (e.g., tankers), mobile platforms, oil drilling platforms, etc. Land-based ASTs are a common component of tank farms utilized in various processing workflows, including crude oil, liquefied gas, and various petrochemical refinements.

Regular inspection of the storage tanks helps ensure that the storage tanks are operating in compliance with safety and environmental guidelines. Currently, storage tanks are generally inspected manually on a simple fixed-cycle schedule, such as on a monthly or a yearly basis. Manual inspections require the suspension of tank operations and the removal of existing product from the tank. Using this approach, the business loses potential revenue generating activity every time a storage tank is shut down and found to be in good operating condition. Additionally, manual inspections require that human technicians enter the storage tank, exposing the technicians to potentially toxic gases and/or residuals, and other hazardous conditions. Safety equipment can further impair the technicians' ability to adequately perform visual inspections as well as hinder the use of inspection equipment.

Because manual inspections are performed by human technicians, the inspection results are always at risk for human errors and are limited by the assessment skill of the technician. Further, human technicians performing manual inspections are unable to identify underlying non-visual factors, such as corrosion and aging. Thus, potential problems may be missed during the discrete manual inspection that can surface during operation, which can cause a much larger loss of revenue and production time.

SUMMARY

Disclosed embodiments include methods for online condition-based monitoring (CBM) for maintenance of at least one tank farm. As used herein, a "tank farm" comprises a plurality of storage tanks that can be ASTs or USTs used for the transport or storage of solid, liquid or gaseous products. In the particular case of oil/gas products, the tank farm may be known in the trade as an oil depot, oil installation or an oil/gas terminal, which may be used for the storage of oil and/or petrochemical products, and from which these products are usually transported to end users or to other storage facilities.

One disclosed embodiment comprises a method for online CBM of at least one tank farm including a plurality of storage tanks that includes providing a tank model. The tank model includes at least one of a diagnostic tank model(s) and a predictive tank model(s). The tank model is based on calculated tank metrics archived in a data store (e.g. data historian) which is derived from collected historical data. The calculated tank metrics include tank operational metrics based on past operation of the plurality of storage tanks and tank condition metrics based on tank inspection or maintenance data for the plurality of storage tanks. The tank model provides relationships between the tank condition metrics and the tank operational metrics.

Results are generated using the tank model including at least one failure indicia for at least a first of the plurality of storage tanks using (i) the calculated tank metrics archived in the data store and (ii) current data for the first tank as inputs to the tank model. "Current data" as used herein refers to data that is measured and utilized in real-time or near-real time. "Current data" as used herein is not stored as stored data (e.g., data that is stored in an electronic or magnetic-based storage).

The failure indicia is processed for the condition-based scheduling of at least one maintenance task for the first tank. The failure indicia generally includes at least one of an abnormal tank condition, an estimate of fault extent, a likelihood of one or more specific failures, long-term sensor degradation including drift or bias, and an estimate of a time-to-failure as a function of stress. Another disclosed embodiment comprises a system including at least one tank farm that includes an online CBM system disclosed herein.

DETAILED DESCRIPTION

Figure 1:
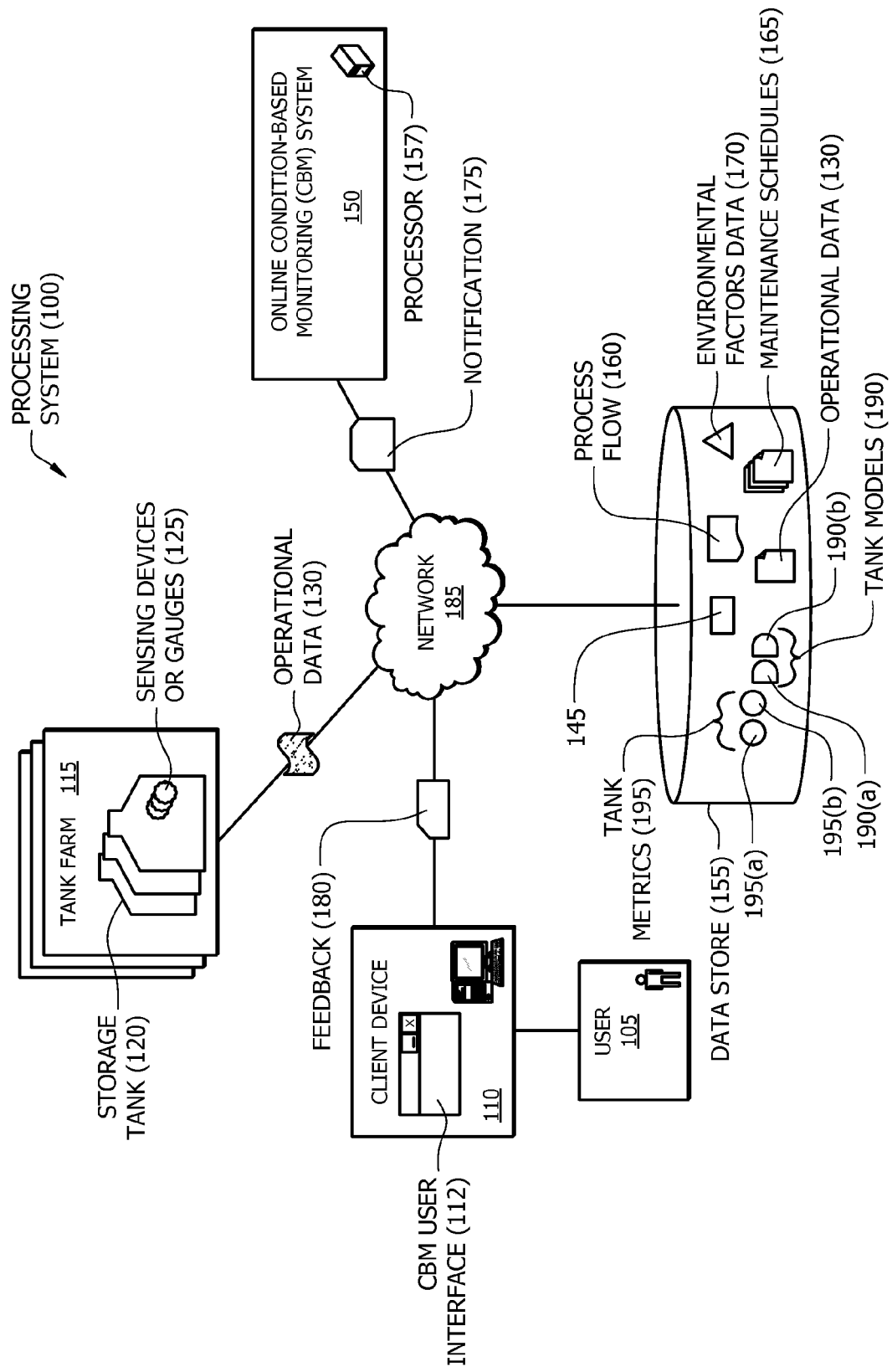
FIG. 1 is a schematic diagram depicting a processing system including an online CBM system that determines maintenance schedules for a plurality of storage tanks in a tank farm, in accordance with an embodiment of the invention.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

One disclosed embodiment comprises an online CBM system for tank farms. Disclosed CBM systems analyze current data and historical tank maintenance data for the storage tanks of a tank farm. A maintenance schedule based on tank condition is created for the maintenance tasks to address potential problems before they reach a critical damage level to avoid unscheduled shut downs. The maintenance schedule can take various factors into account when scheduling maintenance tasks in order to minimize the disruption to the operation of the tank farm.

FIG. 1 is a schematic diagram depicting an exemplary processing system 100 that includes an online CBM system 150 to determine maintenance schedules 165 for the storage tanks 120 of a tank farm 115 in accordance with an embodiment of the invention. It should be noted that this embodiment can be applied to processing systems having new or existing tank farms 115, as well as to processing systems having more than one tank farm 115. The tank farm 115 is not limited to conventional tank farms, and as used herein can include storage tanks that are embodied as tank terminals, or part of refining facilities, whether fixed in location, or movable in location (e.g., on board ship).

The tank farm 115 comprises a plurality of storage tanks 120. As noted above, the plurality of storage tanks can be ASTs or USTs. For example, the storage tanks 120 can be a container designed for housing crude material, a product and/or by-product of a processing workflow. Each storage tank 120 can be equipped with one or more sensing devices or gauges 125. The sensing devices or gauges 125 can be configured to capture and convey operational data 130 for the storage tanks 120 through wired and/or wireless communications over the network 185 to the online CBM system 150. Network 185 is generally a secure network that includes a secure network protocol and appropriate firewall protection.

Examples of sensing devices or gauges 125 can include, but are not limited to, a temperature sensor such as a multi-spot thermocouple, a level gauge, a flowmeter, a pressure transmitter, a water level sensor, an acoustic sensor, an infrared sensor, a gas chromatograph, a fiber-optic sensor, a corrosion monitoring sensor, and a liquid-sensing probe. Each sensing device or gauge 125 can be coupled to the storage tank 120 so as to capture the operational data 130. For example, measuring input and output flow rates 130 generally involves installation of a flowmeter 125 at both the inlet and outlet ports, or the use the level gauge data to infer the flow rates.

The operational data 130 captured by the sensing devices or gauges 125 can quantify the operating conditions of the storage tank 120 at the time of data capture. For example, a level gauge can measure the amount of a liquid product contained within the storage tank 120 at a particular time. Capturing of the operational data 130 can be performed continuously in real-time, or at predetermined time intervals.

The online CBM system 150 can represent a computing system including a processor 157 configured to automatically and dynamically determine the maintenance schedules 165 for the storage tanks 120 of the tank farm 115 that takes into account the particular operating conditions reflected in current data from each of the storage tanks 120. The maintenance schedule 165 is generally an aperiodic schedule that can represent a calendar listing of maintenance tasks and the date to perform the maintenance tasks on the storage tanks 120 of the tank farm 115.

As described above, conventional maintenance scheduling approaches often utilize fixed-time (e.g., monthly or yearly) schedules that do not account for the current operating condition of the storage tanks 120. Thus, under conventional maintenance approaches, storage tanks 120 can be unnecessarily scheduled for maintenance inspections, or be scheduled too late to avoid problems, which in either case disrupts operations and decreases revenues.

To determine the maintenance schedule 165 for an storage tank 120, the online CBM system 150 can utilize the operational data 130 received from one or more of the storage tank's 120 associated sensing devices or gauges 125, historical tank maintenance data 145, the process flow 160, and environmental factors data 170. The operational data 130 can correspond to the data collected by and received from the sensing devices or gauges 125 of the tank farm 115. The operational data 130 can be stored in a data store 155 that is accessible by the online CBM system 150.

The tank models 190 and tank metrics 195 are stored in data store 155. As described above, the tank model 190 is at least one of a diagnostic tank model 190($a$) and a predictive tank model 190($b$) based on calculated tank metrics 195 archived in data store 155, that is derived from historical collected data. The tank metrics 195 include tank operational metrics 195($a$) based on past operation of the plurality of storage tanks 120 and tank condition metrics 195($b$) based on tank inspection or maintenance data for the plurality of storage tanks 120, wherein the tank model 190 provides relationships between the tank condition metrics 195($b$) and tank operational metrics 195($a$).

Results generated using the tank model 190 include at least one failure indicia for at least a first of the plurality of storage tanks 120 (and generally all the storage tanks 120 in the tank farm 115) using the tank metrics 195 and current data as inputs to the tank model 190. The failure indicia is processed for condition-based scheduling at least one maintenance task for the storage tanks 120. The failure indicia generally includes at least one of an abnormal tank condition, an estimate of fault extent, a likelihood of one or more specific failures, long-term sensor degradation including drift or bias, and an estimate of a time-to-failure as a function of stress.

The historical tank maintenance data 145 can represent a variety of information about each storage tank 120 from previous inspections and/or maintenance tasks. Ideally, the historical tank maintenance data 145 begins with the initial installation of the storage tanks 120 in the tank farm 115. The historical tank maintenance data 145 can be stored in a standardized format within data store 155 accessible by the online CBM system 150.

In a situation where the online CBM system 150 is added to an existing processing system 100, historical tank maintenance data 145 may already exist for the storage tanks 120 in a non-electronic and/or non-standardized format. As such, the existing historical tank maintenance data 145 may use additional processing to electronically format and store in order for the online CBM system 150 to utilize the historical tank maintenance data 145.

The environmental factors data 170 can represent the various parameters related to geographical and/or environmental conditions particular to the tank farm 115, such as rainfall, wind, snow, humidity, and so on for storage tanks 120. Environmental conditions can adversely affect measurements captured by the sensing devices or gauges 125 as well as degradation mechanisms. For example, strong winds are known to adversely affect conduction of level gauging sensors and the accuracy of volumetric leak detection methods.

The process flow 160 can be an electronic representation of the processing workflow being performed by the storage tanks 120. The process flow 160 can describe the steps of the workflow as well as information specific to the batch being processed. For example, the process flow 160 can contain the theoretical or estimated amounts of each product, production rates, and consumption rates.

Although the online CBM system 150 does not generally perform process management functions, the online CBM system 150 can utilize the information of the process flow 160 when determining the maintenance schedule 165. For example, the online CBM system 150 can use the process flow 160 to determine the date when a storage tank 120 is projected to contain a minimal amount of product in order to schedule a maintenance task at that time. Thus, by scheduling the maintenance task at such a time, a smaller amount of product will be wasted when emptying the storage tank 120 and thus more product processed.

The online CBM system 150 can include multiple process flows 160, such as one for each process workflow being conducted in the tank farm 115. It is also possible for the product of a storage tank 120 to be used in multiple process flows 160. As such, the online CBM system 150 can include logic to resolve conflicts and consider the constraints of the multiple process flows 160 upon the maintenance schedule 165.

When a maintenance schedule 165 is created or when a new maintenance task is added, the online CBM system 150 can send a designated user 105 a notification 175. The notification 175 can be an electronic message conveyed over the network 185, which is generally a secure network that includes a secure network protocol. A variety of information can be contained within the notification 175, including, but not limited to, the maintenance schedule 165 for the storage tank 120, supporting data, the process flow 160, direction to auxiliary related documents, a feedback mechanism, and the like.

The notification 175 can be presented to the user 105 within a CBM user interface 112 associated with the online CBM system 150. The CBM user interface 112 can be a software application configured to interact with the online CBM system 150, providing the user 105 with access to additional functionality and/or data of the online CBM system 150, such as reporting functions.

The CBM user interface 112 can be configured to operate upon a client device 110. The client device 110 can be a computing device capable of communicating with the online CBM system 150 over the network 185.

Via the CBM user interface 112, the user 105 can provide feedback 180 via a notification 175. Feedback 180 can represent verification 370 and/or modification for the maintenance schedule 165 referenced in the notification 175. That is, the feedback 180 can indicate to the online CBM system 150 that the scheduling of a maintenance task has been accepted, rescheduled, or rejected. Further, the feedback 180 can be utilized by the online CBM system 150 for adjusting generation of subsequent maintenance schedules 165.

System 100 can be expanded to interface with additional computing systems, such as Business Process Management (BPM) systems, remote service systems, instant messaging systems, quality assurance systems, and the like.

Network 185 can generally include any hardware/software/and firmware for conveying data encoded within carrier signals. Data can be contained within analog or digital signals and conveyed though data or voice channels. Network 185 can include local components and data pathways necessary for communications to be exchanged among computing device components and between integrated device components and peripheral devices. Network 185 can also include network equipment, such as wired and/or wireless routers, data lines, hubs, and intermediary servers which together form a data network, such as Ethernet. Network 185 can also include circuit-based communication components and mobile communication components, satellite internet, such as telephony switches, modems, cellular communication towers, and the like. Network 185 can include line based and/or wireless communication pathways.

As used herein, data store 155 can be a physical or virtual storage space configured to store digital information. Data store 155 can be physically implemented within any type of hardware including, but not limited to, a magnetic disk, an optical disk, a semiconductor memory, a digitally encoded plastic memory, a holographic memory, or any other recording medium. Data store 155 can be a stand-alone storage unit as well as a storage unit formed from a plurality of physical devices. Additionally, information can be stored within data store 155 in a variety of manners. For example, information can be stored within a database structure or can be stored within one or more files of a file storage system, where each file may or may not be indexed for information searching purposes. Further, data store 155 can utilize one or more encryption mechanisms to protect stored information from unauthorized access. In one embodiment, data store 155 can be associated with software (e.g., database software) executing on hardware, which performs a data management, indexing, analyzing, or searching function.

The client device 110 and online CBM system 150 can be computing systems comprising one or more central processing units (CPUs) such as processor 157, a volatile memory, a non-volatile memory, and other computing components interconnected via a bus. The CPU's can execute a set of computer program products, such as software and firmware, which can be stored in a memory. In one embodiment, client device 110 and/or online CBM system 150 can be implemented as discrete computing devices (e.g., personal computers and/or servers) having functionality detailed herein. In another embodiment, online CBM system 150 and/or client device 110 can be a distributed system comprising multiple discrete computing devices interconnected to each other such as cloud computing. For example, online CBM system 150 can include a cluster of computers and/or a service oriented architecture (SOA) system. In another example, client device 110 can comprise a graphical user interface (GUI) or a standard browser, which permits user 105 to interact with a Web based software application, such as a software application that includes one or more Web services as components.

Figure 2:
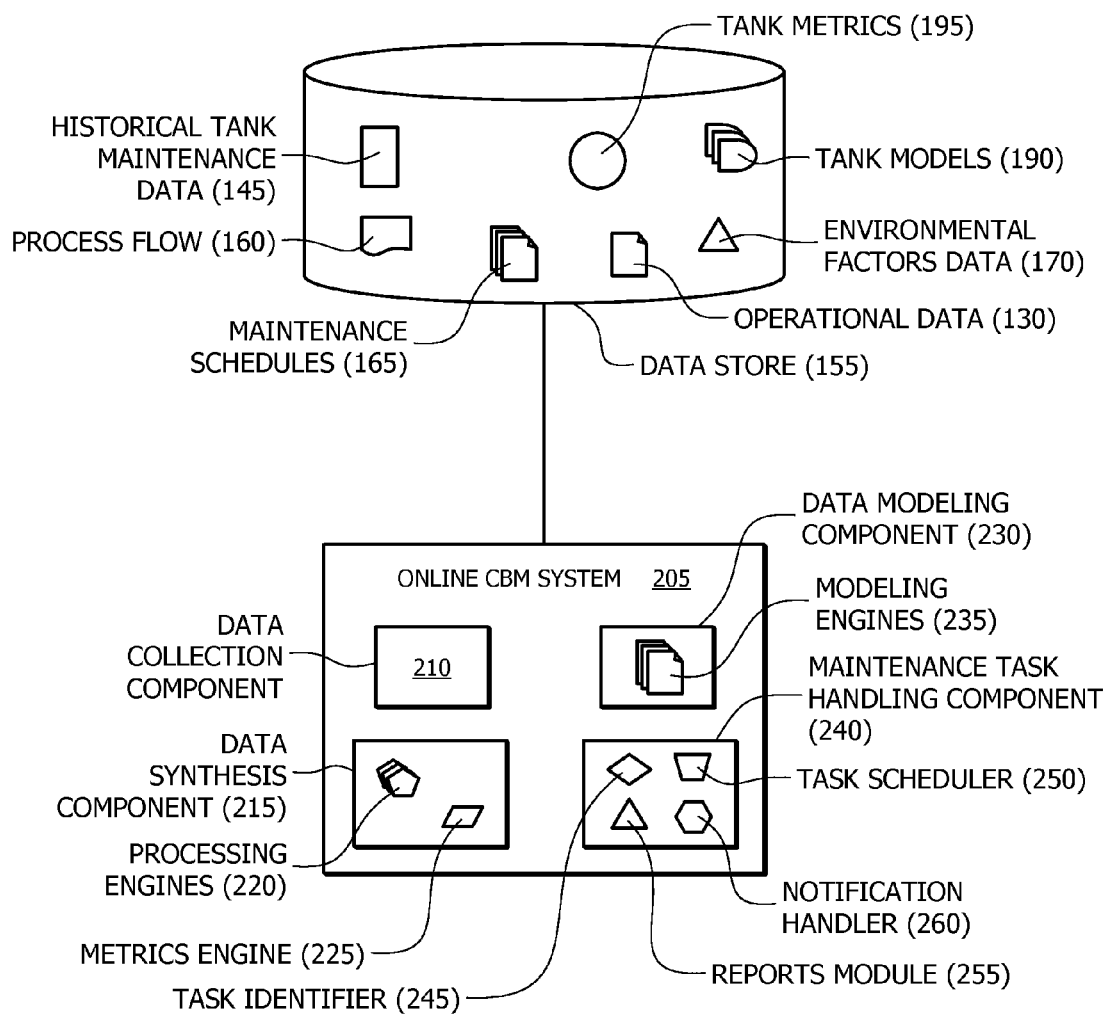
FIG. 2 is a schematic diagram illustrating an online CBM system coupled to a data store in accordance with an embodiment of the invention.

FIG. 2 is a schematic diagram illustrating an online CBM system 205 coupled to a data store 155 in accordance with an embodiment of the invention. The online CBM system 205 can represent a specific embodiment of the online CBM system 150 shown in FIG. 1.

The online CBM system 205 can include a data collection component 210, a data synthesis component 215, a data modeling component 230, a maintenance task handling component 240. The data collection component 210 can be configured to aggregate the various items of data utilized by the online CBM system 205. Data store 155 is shown including operational data 130 and historical tank maintenance data 145, process flow 160, maintenance schedules 165, tank metrics 195, tank models 190 and environmental factors data 170.

As described above, results generated using the tank model 190 includes at least one failure indicia for at least a first of the plurality of storage tanks using the tank metrics 195 and current data as inputs to the tank model 190. The failure indicia is processed for condition-based scheduling at least one maintenance task for the storage tank. As described above, the failure indicia generally includes at least one of an abnormal tank condition, an estimate of fault extent, a likelihood of one or more specific failures, long-term sensor degradation including drift or bias, and an estimate of a time-to-failure as a function of stress.

The data collection component 210 passes data to the data synthesis component 215. The data synthesis component 215 can be configured to perform various data processing and analytical tasks upon the data received. To perform these tasks, the data synthesis component 215 can include processing engines 220 and a metrics engine 225. The processing engines 220 can represent the software implementations of data processing methods, such as a signal processing engine and an image processing engine, as well as various data filtering methods.

The metrics engine 225 can represent a software algorithm and/or application capable of calculating tank metrics 195 for the storage tanks 120. Tank metrics 195 can characterize the actual tank condition and previous operating conditions. The tank metrics 195 can be further categorized based on the primary source data. Tank operational metrics 195(a), such as tank capacity utilization metrics, fluid characterization metrics and climate severity metrics, can be calculated from the operational data 130 and environmental factors data 170 for the storage tanks 120. Tank condition metrics 195(b), such as tank corrosion grade and sludge grade, can be determined from the historical tank maintenance data 145. As described above, tank metrics 195 can be stored within the data store 155.

In an alternate embodiment, the processing engines 220 and metrics engine 225 of the data synthesis component 215 can reside on computing devices remote from, but accessible by the online CBM system 205. The data modeling component 230 can be configured to utilize one or more modeling engines 235 to generate tank models 190 based upon the data from the data collection component 210, the tank metrics 195, the process flow 160, and/or the environmental factors data 170. The modeling engines 235 can represent a software algorithm and/or application capable of simulating a process and/or operation for a set of given parameters.

The tank models 190 generated by the modeling engines 235 as described above can be both diagnostic and predictive in nature, and can focus on detriments specific to storage tanks, such as corrosion, deformation, sludge and cracking. Diagnostic tank models 190(a) (see FIG. 1) can utilize relationships between the tank condition metrics 195(b) and tank operational metrics 195(a). Diagnostic tank models 190(a) (See FIG. 1) can be used to detect and explain an abnormal tank condition and/or sensor conditions and/or estimate the nature and extent of an underlying fault. Examples of diagnostic tank models 190(a) can include, but are not limited to, physics-based models, state-based models, state observers, neural models, fuzzy models, hybrid models, and the like.

Predictive tank models 190(b) (See FIG. 1) can be used to estimate the remaining useful time for a storage tank, or when the next maintenance task should be scheduled. Predictive tank models 190(b) can utilize model-based, probabilistic, and/or data-driven methods. A predictive tank model 190(b) can also project the progression of an incipient fault.

The maintenance task handling component 240 can be configured to determine the need for and scheduling of maintenance tasks. Additionally, the maintenance task handling component 240 can provide a user with access to the variety of data collected and/or generated by the online CBM system 205. The maintenance task handling component 240 can include a task identifier 245, a task scheduler 250, a reports module 255, and a notification handler 260.

The task identifier 245 can be the functional element of the maintenance task handling component 240 configured to analyze the tank models 195 to identify the need to perform a maintenance task upon the storage tanks. The task identifier 245 can be configured to utilize heuristic learning algorithms.

The task scheduler 250 can then determine the maintenance schedule for the identified tasks. The task scheduler 250 can be configured to take into account the current operating condition of the storage tanks when scheduling maintenance tasks. Additionally, the task scheduler 250 can be configured to also examine scheduling at the tank farm level as well as the storage tank level in order to group together storage tanks requiring performance of the same maintenance task.

The reports module 255 can be configured to provide a user with a variety of maintenance and/or data reports. The reports generated by the reports module 255 can be accessed by the user via the CBM user interface (not shown). The notification handler 260 can create and convey notifications to a designated user. Additionally, the notification handler 260 can direct feedback received for a notification to the appropriate component of the online CBM system 205.

Figure 3:
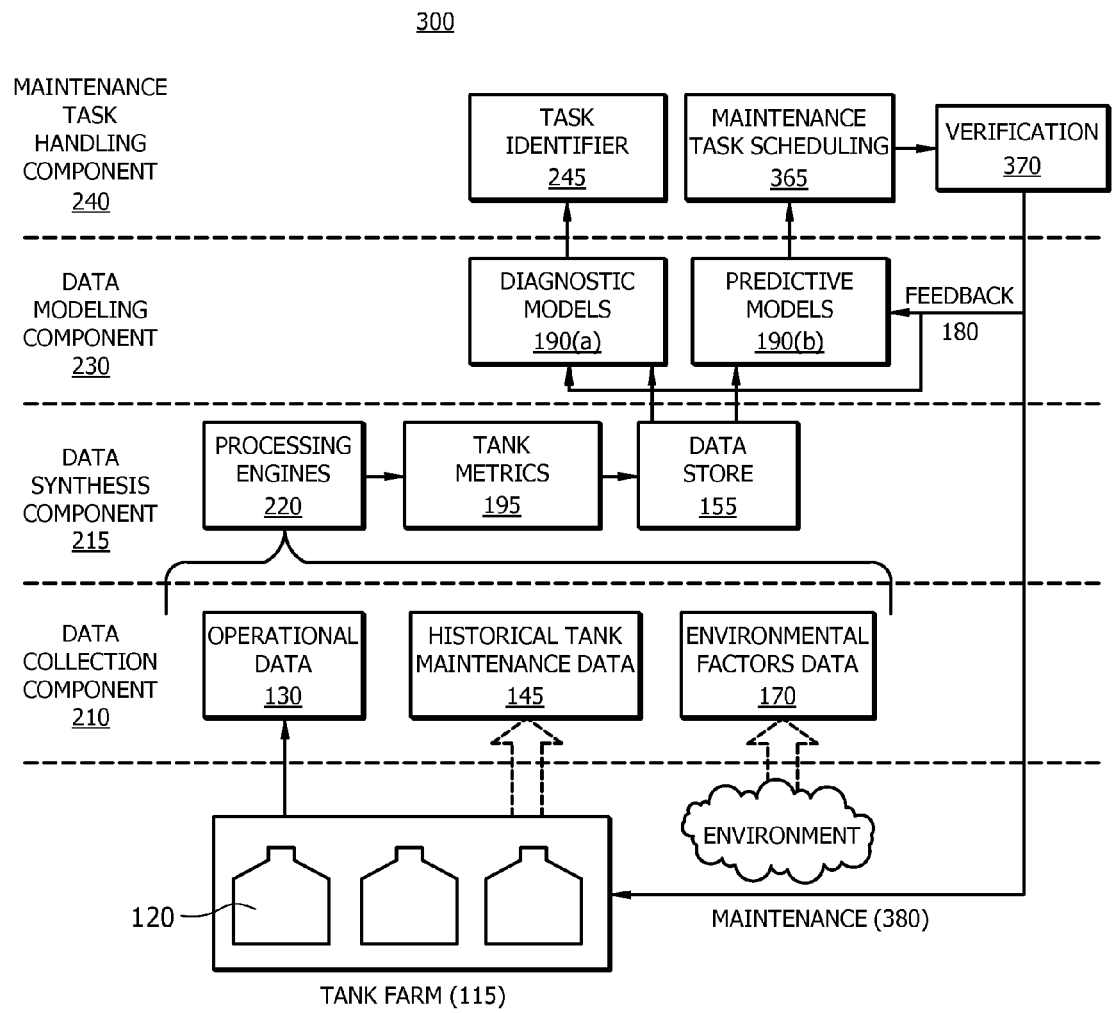
FIG. 3 is an illustration of the functional flow of an online CBM system in accordance with another embodiment of the invention.

FIG. 3 is an illustration of the functional flow 300 of an online CBM system in accordance with an embodiment of the invention. Functional flow 300 can be utilized by system 100 comprising online CBM system 150 and/or online CBM system 205. Functional flow 300 can illustrate the functions performed by the components 210, 215, 230 and 240 of the online CBM system. In functional flow 300, the data collection component 210 can gather operational data 130, historical tank maintenance data 145, and environmental factors data 170 for a tank farm 115.

The operational data 130 can be collected directly from the storage tanks 120 of the tank farm 115. The historical tank maintenance data 145 can be retrieved from a data store (not shown) associated with the tank farm 115. The environmental factors data 170 can be obtained from sources that measure the conditions of the environment around the tank farm 115. For example, weather (e.g., temperature, humidity and wind) data 170 can be acquired from a weather service database.

The data 130, 145 and 170 gathered by the data collection component 210 can then be passed to the data synthesis component 215. Processing engines 220 of the data synthesis component 215 can then perform data processing to prepare the data 130, 145 and 170. Data processing can include data normalization and data filtering so that the amount of raw data can be reduced.

From the processed data, tank metrics 195 can be derived. The tank metrics 195 can then be archived in data store 155 and used by the data modeling component 230. The data modeling component 230 can generate diagnostic models 190(a) and predictive models 190(b). As described above, tank model 190 can include at least one of a diagnostic model 190(a) and a predictive model 190(b).

The models 190(a) and 190(b) can then be utilized by the task identifier 245 of the task handling component 240 for task identification and maintenance task scheduling 365 operations. The maintenance task scheduling 365 operation can generate and/or modify the maintenance schedule 165 for the storage tanks 120. When a maintenance task is scheduled, verification 370 can occur. Feedback 180 from verification 370 can be utilized by the data modeling component 230 to adjust generation of the diagnostic models 190(a) and/or predictive models 190(b). At the verified time, the maintenance 380 can then be conducted upon the tank farm 115.

FIGS. 1-3 illustrate the architecture, functionality, and operation of possible implementations of systems, methods, and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although disclosed embodiments have been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In light of the forgoing description, it should be recognized that the subject matter in this Disclosure can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA), and/or a digital signal processor (DSP) could also be used to achieve a similar result.

Disclosed embodiments can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit this Disclosure in any way, except as set forth in the following claims.

What is claimed is:

1. A method for online condition-based monitoring (CBM) of at least one tank farm including a plurality of storage tanks, comprising:

providing a tank model comprising at least one of a diagnostic tank model and a predictive tank model based on calculated tank metrics archived in a data store that is derived from collected historical data including tank operational data, said calculated tank metrics including tank operational metrics based on said tank operational data for said plurality of storage tanks and tank condition metrics based on tank inspection data or tank maintenance data for said plurality of storage tanks, said tank model providing relationships between said tank condition metrics and said tank operational metrics;

generating results using said tank model including at least one failure indicia for at least a first of said plurality of storage tanks using said calculated tank metrics archived in said data store and current data for said first tank as inputs to said tank model, and processing said failure indicia for scheduling at least one maintenance task for said first tank.

2. The method of claim 1, wherein said failure indicia includes at least one of an abnormal tank condition, an estimate of fault extent, a likelihood of one or more specific failures, long-term sensor degradation including drift or bias, and an estimate of a time-to-failure as a function of stress.

3. The method of claim 1, wherein said processing further comprises processing of said results to generate a summarization of an estimated condition of respective ones of said plurality of storage tanks, and clustering respective ones of said plurality of storage tanks into priority groups according to said estimated conditions.

4. The method of claim 1, wherein said collected historical data comprises said tank operational data, said tank inspection data, said tank maintenance data, tank background information, and environment condition data including at least one of humidity, temperature and wind.

5. The method of claim 1, wherein said tank operational data is automatically collected by a plurality of sensors or gauges at each of said plurality of storage tanks, and said tank inspection data, and said tank maintenance data are manually collected.

6. The method of claim 5, wherein said plurality of sensors or gauges are selected from a temperature sensor, a level gauge, a flow meter, a pressure transmitter, a water level sensor, an acoustic sensor, a corrosion monitoring sensor, an infrared sensor, a gas chromatograph, a fiber-optic sensor, and a liquid-sensing probe.

7. The method of claim 1, wherein said collected historical data is transferred to said data store using a secure network.

8. The method of claim 1, further comprising:

automatically conveying an electronic notification to a specified user of said online CBM, wherein said electronic notification comprises said maintenance task and includes a feedback mechanism, wherein said feedback mechanism allows at least one of a verification selection, a reschedule selection, and a rejection selection, and receiving from said specified user feedback data via said feedback mechanism.

9. The method of claim 8, wherein said tank model is updatable, and wherein said feedback data is utilized by said online CBM to modify a subsequent generation of said tank model.

10. The method of claim 1, wherein said tank model comprises both said diagnostic tank model and said predictive tank model.

11. The method of claim 1, wherein said tank farm processes oil or gas products.

12. The method of claim 1, wherein said plurality of storage tanks comprise above the ground storage tanks (ASTs).

13. The method of claim 1, wherein said plurality of storage tanks comprise underground storage tanks (USTs).

14. A system for the online condition-based monitoring (CBM) of a tank farm comprising a plurality of storage tanks, comprising:

a plurality of sensors or gauges at each of said plurality of storage tanks;

a data store for storing archived tank data; and an online CBM system for said tank farm, comprising:

a tank model comprising at least one of a diagnostic tank model and a predictive tank model based on calculated tank metrics archived in said data store that is derived from collected historical data including data including tank operational data obtained in part from said plurality of sensors or gauges, said calculated tank metrics including tank operational metrics based on said tank operational data for said plurality of storage tanks and tank condition metrics based on tank inspection or maintenance data for said plurality of storage tanks, said tank model providing relationships between said tank condition metrics and said tank operational metrics;

wherein said tank model generates results including at least one failure indicia for at least a first of said plurality of storage tanks using said calculated tank metrics archived in said data store and current data for said first tank as inputs to said tank model, and a data processor for processing said failure indicia for scheduling at least one maintenance task for said first tank.

15. The system of claim 14, wherein said failure indicia includes at least one of an abnormal tank condition, an estimate of fault extent, a likelihood of one or more specific sensor failures and/or abnormal tank condition, long-term sensor degradation including drift or bias, and an estimate of a time-to-failure as a function of stress.

16. The system of claim 14, wherein said data processor processes said results to generate a summarization of an estimated condition of respective ones of said plurality of storage tanks, and clusters respective ones of said plurality of storage tanks into priority groups according to said estimated conditions.

17. The system of claim 14, wherein said collected historical data comprises said tank operational data, said tank inspection data, said tank maintenance data, tank background information, and environment condition data including at least one of humidity, temperature and wind.

18. The system of claim 14, wherein said plurality of sensors or gauges are selected from a temperature sensor, a level gauge, a flow meter, a pressure transmitter, a water level sensor, an acoustic sensor, a corrosion monitoring sensor, an infrared sensor, a gas chromatograph, a fiber-optic sensor, and a liquid-sensing probe.

19. The system of claim 14, wherein said tank model comprises both said diagnostic tank model and said predictive tank model.

20. The system of claim 11, wherein said tank farm processes oil or gas products.

* * * * *